US010043412B2

(12) United States Patent
Lore

(10) Patent No.: US 10,043,412 B2
(45) Date of Patent: Aug. 7, 2018

(54) SYSTEM FOR PROMOTING TRAVEL EDUCATION

(71) Applicant: Dean Joseph Lore, Redmond, WA (US)

(72) Inventor: Dean Joseph Lore, Redmond, WA (US)

(*) Notice: Subject to any disclaimer, the term of this patent is extended or adjusted under 35 U.S.C. 154(b) by 1386 days.

(21) Appl. No.: 13/902,825

(22) Filed: May 26, 2013

(65) Prior Publication Data
US 2014/0349258 A1    Nov. 27, 2014

(51) Int. Cl.
G09B 19/00    (2006.01)
G09B 5/12     (2006.01)
A63F 13/216   (2014.01)
A63F 13/69    (2014.01)
A63F 13/795   (2014.01)

(52) U.S. Cl.
CPC ........ *G09B 19/0061* (2013.01); *A63F 13/216* (2014.09); *A63F 13/69* (2014.09); *A63F 13/795* (2014.09); *G09B 5/125* (2013.01)

(58) Field of Classification Search
CPC .......................... G09F 21/04; G09B 19/0061
USPC ................................................. 434/170, 130
See application file for complete search history.

(56) References Cited

U.S. PATENT DOCUMENTS

| 5,413,355 | A  |   | 5/1995  | Gonzalez     |
| 6,773,344 | B1 |   | 8/2004  | Gabai et al. |
| 6,959,166 | B1 |   | 10/2005 | Gabai et al. |
| 7,860,516 | B2 | * | 12/2010 | Hodges ................... H04W 8/22 455/456.1 |
| 7,967,657 | B2 |   | 6/2011  | Ganz         |
| 8,149,136 | B2 | * | 4/2012  | Feroldi .................. B60Q 1/503 340/463 |
| 8,184,097 | B1 |   | 5/2012  | Barney et al.|
| 8,292,743 | B1 |   | 10/2012 | Etter et al. |
| 8,321,364 | B1 |   | 11/2012 | Gharpure et al. |
| 8,373,659 | B2 |   | 2/2013  | Barney et al.|
| 2002/0068500 | A1 |   | 6/2002 | Gabai et al. |
| 2004/0183674 | A1 | * | 9/2004 | Ruvarac ............. G08B 21/0266 340/539.13 |
| 2004/0229696 | A1 |   | 11/2004 | Beck        |

(Continued)

FOREIGN PATENT DOCUMENTS

EP    2543972    9/2013

*Primary Examiner* — Thomas Hong
(74) *Attorney, Agent, or Firm* — Jason P. Webb; Pearson Butler

(57) ABSTRACT

There is a system and method for promoting travel education including a toy having a particular geographic association represented visually on the toy. The toy includes a unique identifier observable on the toy and associated with the particular geographic association. The system includes a management module configured to interact with the toy and thereby promote travel education. The management module includes a user account management module associated with the unique identifier of the toy and configured to manage a user account associated therewith and to receive location information in regards to the toy. The management module includes a geographic rules module in communication with the user account management module and configured to store, provide and enforce a set of rules on the user account based on the particular geographic location of the toy associated with the user account.

20 Claims, 10 Drawing Sheets

(56) References Cited

U.S. PATENT DOCUMENTS

| | | |
|---|---|---|
| 2007/0143679 A1 | 6/2007 | Resner |
| 2009/0210928 A1* | 8/2009 | Ourega .................. G06F 21/41 |
| | | 726/4 |
| 2011/0047017 A1* | 2/2011 | Lieblang ................ G06Q 30/02 |
| | | 705/14.13 |
| 2012/0149475 A1* | 6/2012 | Schick ................... G06Q 30/02 |
| | | 463/42 |
| 2012/0264349 A1 | 10/2012 | Ciampitti et al. |
| 2012/0295510 A1 | 11/2012 | Boeckle |
| 2013/0041781 A1* | 2/2013 | Freydberg .............. G06Q 50/01 |
| | | 705/27.1 |

\* cited by examiner

FIG. 10

SYSTEM FOR PROMOTING TRAVEL EDUCATION

BACKGROUND OF THE INVENTION

Field of the Invention

The present invention relates to educational toys and educational systems, specifically a system including a toy for promoting travel education.

Description of the Related Art

Toys may be used for a number of educational purposes. Some toys have incidental educational value, while others are known specifically by the moniker of "educational toys." Educational toys are typically built for and used by children. One could make the argument that an educational toy is actually any toy. Most children are constantly interacting with and learning about the world. This definition is ultimately too broad because one could make the same argument about a rock or a stick as it is not uncommon to see a child play with almost anything nearby.

The difference lies in the child's perception or reality of the toy's value. An educational toy should educate. It should instruct, promote intellectuality, emotional or physical development. An educational toy may teach a child about a particular subject or may help a child develop a particular skill. The key difference is the child's learning and development associated with interacting with the toy.

More toys are designed with the child's education and development in mind today than ever before. As parents and educators grow more sensitive to the real or perceived development needs of children, toy manufacturers seek to manufacture and market to these parents.

One of the aspects of a child's education is in learning about their environment, their place in their environment and also about learning about others and their place as well. In particular, children are taught about geography, including but not limited to learning about places, countries, climates, cultures, people, ecosystems and the like and etc. Different tools are used to provide this education, including but not limited to maps, books, quizzes, board games, culturally specific dolls, stories and the like and etc. There are also interactive computer games like the franchises known as "ClueFinders," "Where in the World is Carmen SanDiego" and "Mission Possible World Geography" as well as various simulators (flight simulators, historical/geographic based first-person shooters, strategic battle simulators, and etc.).

Some improvements have been made in the field. Examples of references related to the present invention are described below in their own words, and the supporting teachings of each reference are incorporated by reference herein:

U.S. Pat. No. 6,773,344, issued to Gobai et al., discloses methods and apparatus for integrating interactive toys with interactive television and cellular communication systems are described. Interactive toys have real time conversations with users, preferably employing speech recognition. Interactive toys are preferably connected to at least one interactive toy server which is preferably connected to entertainment, education, sales promotion and other content providers possibly via Internet communication systems. Such a connection may utilize, for example, telephone lines, cellular communication systems, coaxial cables, satellite, DSL or other broadband systems. Interactive toys may be connected, via a wireless link, to a computing device such as a home computer, an Interactive Television set-top box or a base unit which provides Internet connectivity for the toy. Interactive toys may support mobile cellular or satellite communication. These toys are able to provide entertainment, education, sales promotion and other content to a user. Content is provided to users for their toys which enables toys to form relationships with users. Interactive Toys further utilize user knowledge bases to match entertainment, education and sales promotion content to user histories, behaviors and habits. Content is thus personalized to an individual user as well as to a user's environment including the user's location and the time at which the toy is used. Integration of content, such as entertainment, education and sales promotion is provided by merging Interactive Television techniques with Interactive Toys.

U.S. Pat. No. 7,967,657, issued to Ganz, discloses a computer system provides a virtual world. The computer system includes a server subsystem serving virtual world data, via a communication network, and receives data and/or commands. A registration subsystem, coupled to the server subsystem, verifies information from a toy, registers the toy, and determines a quantity of toys registered by a user who is registering the toy. The verifying includes determining the validity of the information. A virtual world providing subsystem, coupled to the server subsystem, provides the virtual world data, which produces data that presents the virtual world. The virtual world data includes a virtual toy representing the toy and a reward provided to the user for registering the toy. The reward is based on the quantity of toys previously registered by the user, such that the reward received for registering the toy is different than another reward previously received by the user for registering another toy.

U.S. Patent Application Publication No.: 2004/0229696, by Beck, discloses a toy or game play apparatus or method involving a powered host such as a doll or a tablet which operates interactively in a mode of play with one or more non-powered play objects. The host has a preprogrammed microcontroller and a RFID reader/interrogator circuit. Each play object has a RFID tag IC. Each tag IC has a memory holding digital data that includes at least ID information different from that of the other play objects. When the host and a play object are positioned so as to afford RF communication between them, the host can send power to energize the tag IC of the play object. This causes the tag IC to transmit data including at least its ID information back to the host. The host recognizes that transmitted data and makes a presentation in accordance with the mode of play to the user caused by that transmitted data. In one mode the play objects may have a variable aspect, and the host determines and makes a user presentation based on the then current state of the variable aspect.

U.S. Patent Application Publication No.: 2012/0264349, by Ciampitti et al., discloses a character based huggable plush seatbelt cover configured to attach to a vehicle seatbelt is provided. The plush seatbelt cover can incorporate pockets and zippered compartments to accommodate a variety of items that kids want or need to have close by during car travel. The huggable plush toy can attach to a shoulder strap to be carried by a child. An affinity membership program for kids can be created that can entitle members to special discounts on related products. A customizable website can include special offers at affiliate destinations. Various ornamentation can be included to create different characters.

The inventions heretofore known suffer from a number of disadvantages which include not being fun for children, being limited in use, being limited in application, not being educational, not helping kids remember past trips, not enhancing creativity in children, not expanding imagination, not expanding a child's view of the world and their place in it, not allowing interaction with other users, not providing a sense of wonder and exploration, not rewarding travel and exploration, being expensive, being unduly complex, failing to teach geography, not entertaining people on trips, and failing to build a unique story.

What is needed is a system for promoting travel education that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available systems for promoting travel education. Accordingly, the present invention has been developed to provide a fun and entertaining system for promoting travel education.

According to one embodiment of the invention, there is a system for promoting travel education. The system may include a toy that may have a particular geographic association represented visually on the toy. The toy may have a unique identifier that may be observable on the toy and may be associated with the particular geographic association. The toy may include a coupling device that may be configured to couple a body of the toy to an exterior of a vehicle.

The system for promoting travel education may include a management module that may be configured to interact with the toy and may thereby promote travel education. The management module may include a user account management module that may be associated with the unique identifier of the toy and may be configured to manage a user account associated therewith and to receive location information in regards to the toy. The management module may include a geographic rules module that may be in communication with the user account management module and may be configured to store, provide and enforce a set of rules on the user account based on the particular geographic location of the toy associated with the user account. The management module may include a game module that may be in communication with the user account management module and the geographic rules module, and may be configured to provide a game experience related to the toy.

The system for promoting travel education may include a third party collaboration module that may be in communication with the management module and may be configured to provide third party interactivity and collaboration to the user account. The third party collaboration module may include an offer module that may be configured to provide a product offer to a user of the user account management module associated with the toy. The third party collaboration module may include an event management module that may be configured to provide event setup and management capabilities to a user of the user account management module associated with the toy. The third party collaboration module may include a store module that may be configured to provide products available for purchase to a user of the user account management module associated with the toy.

The system for promoting travel education may include a user collaboration module that may be in communication with the management module and may be configured to provide user interactive and collaboration capabilities to a plurality of users of the user account management module, each may have separate user accounts associated therewith. The user collaboration module may include an event management module that may be configured to provide user created event setup and management capabilities to a user of the user account management module associated with the toy. The user collaboration module may include a social media module that may be configured to provide social media interactivity and access to a user of the user account management module associated with the toy.

The system for promoting travel education may include a user interface module that may be in communication with the management module and may be configured to provide user interface capabilities to a user of the user account management module associated with the toy.

According to one embodiment of the invention, there is a method of promoting travel education. The method may include the step of providing a toy that may have a particular geographic association represented visually on the toy. The toy may have a unique identifier observable on the toy and associated with the particular geographic association. The toy may have a coupling device that may be configured to couple a body of the toy to an exterior of a vehicle.

The method of promoting travel education may include the step of interacting with the toy and thereby promote travel education. The step of interacting with the toy may include the step of associating a user account with the unique identifier of the toy, managing a user account associated therewith, receiving location information in regards to the toy, and enforcing a set of rules on the user account based on the particular geographic location of the toy associated with the user account and the received location information. The set of rules may include requiring a user to perform an action before transporting the toy to a particular location. The geographic association may be associated with a climate.

The method of promoting travel education may include the step of associating an event with the user account. The method may include the step of offering a transaction in association with the user account. The method may include the step of providing a communication tool to a plurality of users, thereby permitting the same to communicate with each other.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIGS. 9-10 are prophetic exemplary screenshots of a graphical user interface of a system for promoting travel education, according to one embodiment of the invention.

DETAILED DESCRIPTION OF THE INVENTION

Figure 1:
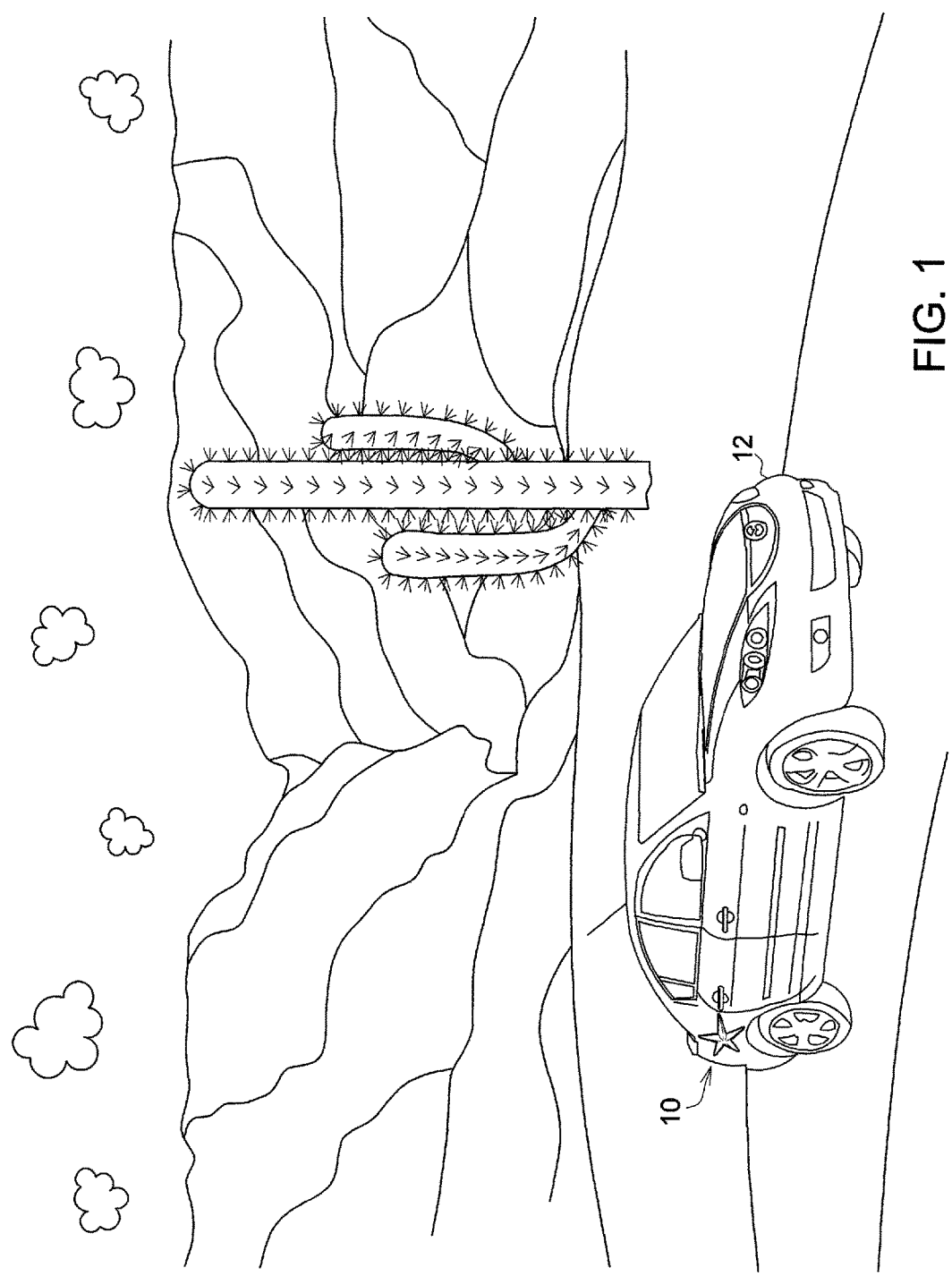
FIG. 1 is a perspective view of a toy coupled to an exterior of a vehicle, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a perspective view of a toy coupled to an exterior of a vehicle, according to one embodiment of the invention. There is shown a toy 10 coupled to an exterior of a vehicle 12 that is traveling through a geographic region that is in contrast to the geographic association represented visually by the toy 10. In particular, the illustrated starfish (associated with the ocean and/or beaches and not associated with the desert) is on a car that is traveling through a desert landscape.

According to one embodiment of the invention, there is a system for promoting travel education. The system includes a toy 10 having a particular geographic association represented visually on the toy 10. The illustrated toy 10 is a starfish configured to represent a geographical association to a beach or shore, therefore representing a geographical association to the ocean. The toy 10 is configured to couple to an exterior of a vehicle 12. The illustrated vehicle is traveling through a desert or canyon.

According to one embodiment of the invention, there is an interactive regionally based system using a magnetic rubber toy character 10 configured to couple on the outside of a car 12 on family trips. When not traveling the toy character 10 may be configured to hold up objects, such as pictures and drawings of kids, on a fridge or other surface that will couple to the toy (generally any ferromagnetic surface wherein the toy includes a magnet). Through a unique serial number identifier on the toy 10 (e.g. RFID, bar code, serial number printed, and/or etc.) the toy 10 may be tracked using mobile devices (e.g. smartphones, tablets, and/or etc.) over a computerized network. In particular, one or more characteristics of the toy (location, status, virtual characteristics, and/or etc. may be entered and/or viewed through the mobile device and thereby the toy 10 is able to interact with the system.

The system is configured to provide a storyline for the toy character 10 (which may be referred to as a stowaway) to explain why the toy 10 is riding on the car 12. The toy character 10 is configured to include characteristics that associate the toy 10 with a particular geographical location or region. The illustrated toy character 10 is a starfish configured to represent a geographical association to a beach or shore, therefore representing a geographical association to the ocean. In addition, as the toy character 10 travels and visits landmarks and/or other geographical locations, places and/or regions, the toy character 10 achieves travel goals, wherein the toy character 10 receives recognition on a website over a computerized network.

The system may include a treasure caching (also known as geocaching) management system that is configured to allow the users to interact with other users and enthusiasts by placing items in particular locations and then storing information about the same in the system. Items placed may include a code/identifier (such as but not limited to a name/number/etc. on one or more stickers) that may then be logged into the system as having been found/placed by the user and/or collected. There may be geographic associated accessories that may be useful for the toy character 10 when traveling and visiting locations and regions that are outside of the toy character's "home" geographical location (coat when traveling to cold places, water when traveling to the desert, etc.).

The associated accessories may include real and/or virtual components that may be provided by the system. Providing the accessories may be in response to one or more actions taken by the user of the account associated with the toy, another user, an associated merchant, a group of users, the system itself and the like and combinations thereof. As a non-limiting example, a child may be prompted to go on a virtual quest in a game world associated with the system in order to get a magical amulet to protect the child's starfish stowaway from the dry climate of the desert before taking the toy to the desert on a real trip (or virtually "heal" some characteristic of the starfish if the trip was taken before obtaining virtual protective item(s)). Accessory items, their procurement and/or use may automatically influence a storyline that is generated, published and/or recorded by the system.

The system may include other accessories that are configured to modify characteristics of the toy character 10, wherein the accessories may be traded. The toy character 10 may be configured to accumulated points configured to unlock levels that may then include titles, privileges, accessories, capabilities, games, and etc. similar to how role playing games allow for characters/accounts to change characteristics. Such account changes may automatically influence a storyline.

Third parties may host events, treasure caches, and etc. for the users of the toy character 10 to find or otherwise participate in and that may attract the users to the third parties. Such events may be announced to users by the system and invitations may be automatically issued including any requirements for attendance associated with any differences between the specific characteristics of the toy and the characteristics associated with the event. As a non-limiting example, a pizza establishment that caters to children may throw an underwater adventure party event (the event characteristic of being underwater may be entirely virtual or it may be held at a swimming pool, water park or otherwise actually associated with water) in association with the system and the system may then automatically send invitations to appropriate users of the system including an instruction for any toys not able to breathe underwater that they need to acquire one or more virtual items/achievements/etc. that will allow them to attend the event with their toy in a way that keep the toy safe in that environment. If there are other characteristics of the event that do not match with characteristics of other toys, those toys would be automatically offered/suggested similar preparations before the event and/or along with the invitation.

According to one embodiment of the invention, the system is configured to geographically associate a toy 10 that may be configured to couple to an outside of a car 12. The toy 10 includes a unique identifier configured to allow the user to interact online over a computerized network. The system is configured to provide a geography based entertainment system that includes geographically associated toys and accessories. The toy 10 and the online system are configured to track travel of the toy 10 and provide an ongoing interactive story for the user that is based on the travel of the toy 10.

In one non-limiting example, there is a geographically associated toy that couples to an outside of a vehicle and has a unique identifier that allows the user to interact with a system over a network.

In another non-limiting example, there is a geography-based entertainment system that includes geographically associated toys and accessories.

In still another non-limiting example, there is a toy and online system that tracks travel of the toys and provides and automated ongoing interactive story for each toy and their associated user(s) that is based on the travel for each toy.

Advantageously, the system teaches children about the kinds of preparations needed for travel, gives them practice in doing the same, gives people who love travel a way to associate in fun ways, teaches them in a fun way about different places and promotes travel and learning among other benefits.

Figure 2:
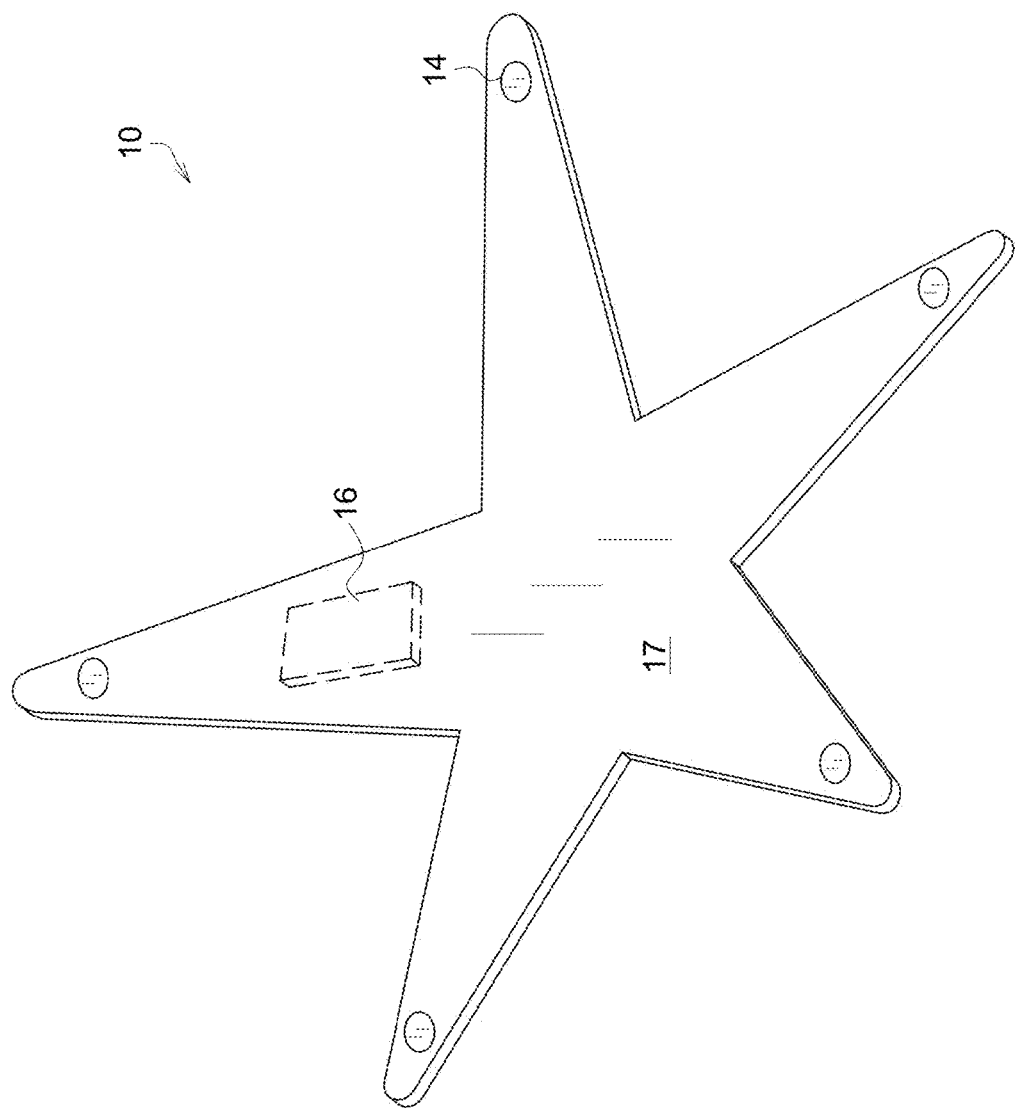
FIG. 2 is a rear perspective view of a toy of a system for promoting travel education, according to one embodiment of the invention.

FIG. 2 is a rear perspective view of a toy of a system for promoting travel education, according to one embodiment of the invention. There is shown a toy 10 having a unique identifier 16 and a coupling device 14.

The illustrated toy 10 includes a particular geographic association represented visually on the toy 10. In particular, the illustrated toy is a starfish, which is characteristically associated with beaches and oceans. Other non-limiting examples of geographic associations represented visually on the toy include wording (e.g. "of the sea," "from the jungle," "the Mountain Lord"), icons that map to a key wherein particular icons are specifically identified with regions/climates/locations/etc., images of outlines of countries/states/provinces/cities/etc., color-coding that maps to a key wherein particular colors and/or color schemes are specifically identified with regions/climates/locations/etc., and the like and combinations thereof. Generally speaking, a geographic association represented visually on a toy permits a viewer to identify toy as being associated with a particular geographic characteristic, such as but not limited to a region, climate, country, environment, ecosystem, province, state, city, altitude, landmark, object of interest, latitude, longitude, or the like and/or combinations thereof.

The toy 10 includes a unique identifier 16 observable on the toy 10. In the illustrated example, the unique identifier is an embedded RFID chip configured to wirelessly transmit a unique identifier code to an RFID reader that may be associated with, integral to, and/or in communication with a mobile device. Other non-limiting examples of unique identifiers include printed numbers/characters, QR codes, texture coding, and the like and combinations thereof. In general, a unique identifier 16 permits a user to uniquely identify their toy so that it is easy for the user to interact with the system in regards to the toy and any virtual representations thereof. The unique identifier may be globally unique or it may be unique only in combination with other information, such as but not limited to an account number associated with a user. As a non-limiting example, a unique identifier may be a name of a toy (e.g. Starry the Starfish) in combination with an email address associated with a user account bob@email.com. In another non-limiting example, a unique identifier may be a serial number written on a sticker disposed on the toy, wherein the serial number in combination with the color of the toy (or another observable characteristic) is globally unique.

The toy 10 includes a coupling device 14 configured to couple a body 17 of the toy 10 to an exterior of a vehicle. In particular, the illustrated coupling device is a set of magnets disposed within the body of the toy such that when the toy is placed against a ferromagnetic surface, such as but not limited to the body of a car, the toy will adhere thereto. Other non-limiting examples of coupling devices include suction cup systems, hook-and-loop systems (i.e. Velcro brand), adhesives, snaps, clips, hooks, tongue and groove systems and the like and combinations thereof. It may be that a portion of the coupling device is permanently attached to a vehicle, which portion acts as a mounting member for the toy to be coupled to. It may be that the toy is partially or completely composed of a magnetic material, such as but not limited to a flexible sheet magnet having decorative elements thereon.

In operation a user is able to attach a toy to their vehicle and travel to places. The user is also able to easily identify the toy as being associated with a particular geographic characteristic. The user is also able to interact with a system as a "representative" of the toy.

The toy may also have other features, such as but not limited to being lighted (LEDs, etc.), actuate-able (moving arms/legs/etc.), audible (recorded sounds/music/speech with playback capabilities), color changing, writable/recordable elements, and the like and combinations thereof. The toy may be water-proof and/or water resistant and may be made of a material that is stain/dirt resistant, such as but not limited to a rubberized plastic. The material of the toy may also be resistant to sun damage as the toy may persist for long periods on the surface of a vehicle traveling through inclement weather and hot sun. It may be that the toy includes no electronics at all and that the unique identifier is present on the toy in a manner that is resistant to damage if dropped, run over, and/or otherwise subject to damaging temperatures/weather/exposure and the like and combinations thereof. In one non-limiting example, the unique identifier is enclosed within a cavity of the toy that is selectably sealable against outside exposure. It may be that the unique identifier is present on the toy in multiple locations. It may be that the unique identifier is embossed and/or engraved in the material of the toy similar to how credit card numbers are present on credit cards such that even if the coloring of the numbers wears off, the embossing/engraving is still readable.

There may be a plurality of types of toys, such as but not limited to starfish associated with beaches/oceans, lizards associated with deserts, goats associated with mountains, trout associated with lakes/streams, penguins associated with arctic climates, and etc. Users may be able to "own" or "adopt" multiple toys having various geographic associations and such may be linked in the user account, such that the virtual aspects of the toys may interact with each other within the system and/or within the ongoing storyline being generated. It may be that particular toys may only be available for sale in regions that share an associated geographic characteristic. Virtual aspects of various toys may have virtual conflict with each other, may compete for resources, may fulfill virtual needs for each other, may assist each other, may assist the user in completion of their "quests" and the like and combinations thereof.

Figure 3:
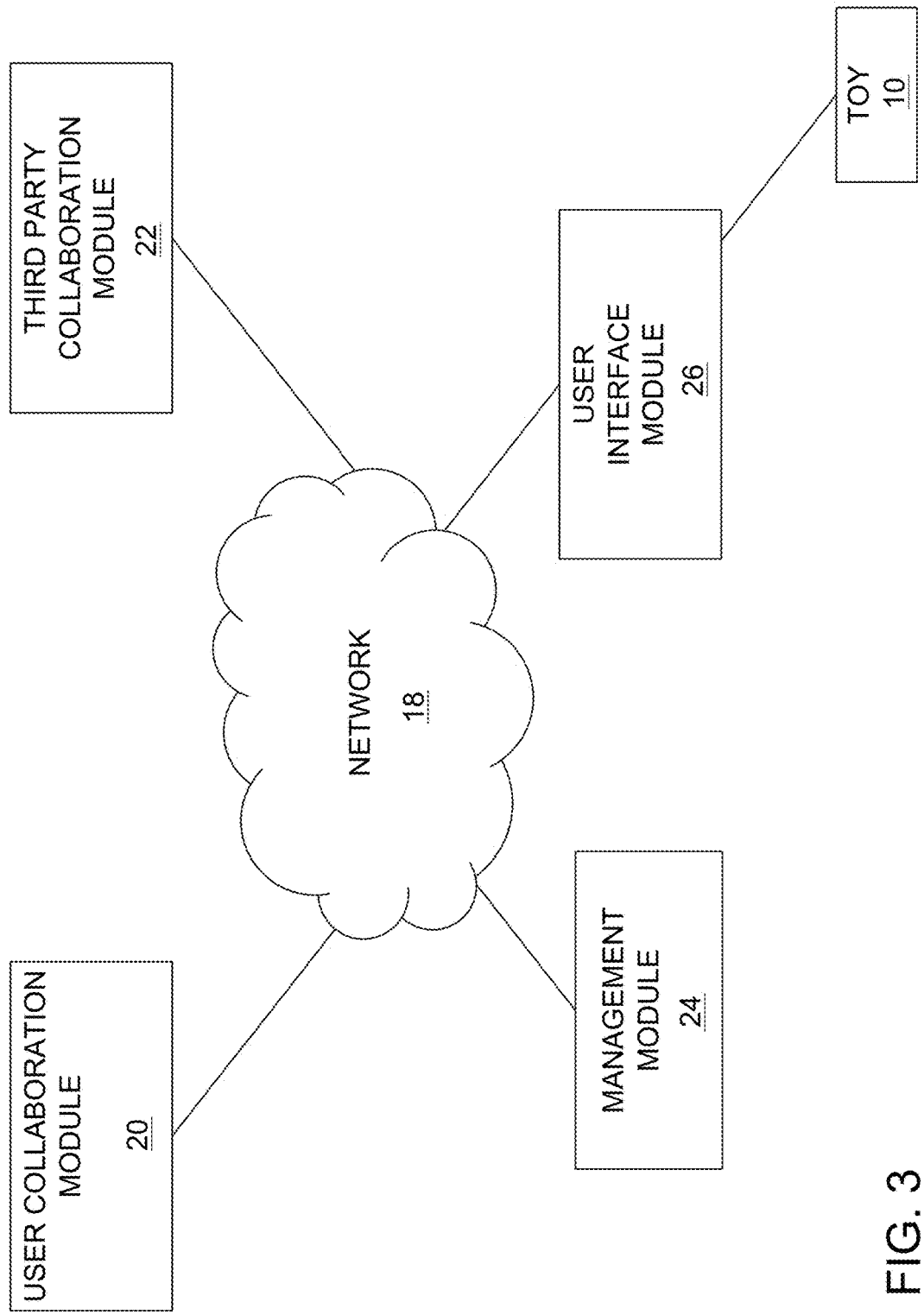
FIG. 3 is a network diagram of a system for promoting travel education, according to one embodiment of the invention.

FIG. 3 is a network diagram of a system for promoting travel education, according to one embodiment of the invention. There is shown a system for promoting travel education 15 including a user collaboration module 20, a third party collaboration module 22, a management module 24 and a toy 10 (through one or more user interface modules 26) in communication with each other over a computerized network 18. The illustrated system permits toy users to experience a virtual interaction with their toys according to rules enforced by the system, play games provided by the system, interact with other toy users, and be involved with third parties, such as but not limited to merchants who may host events associated with the toys.

The illustrated system for promoting travel education 15 includes a toy 10 having a unique identifier observable on the toy 10 and associated with a particular geographic association. The toy 10 is able to interact with the system through a user interface module 26, such as but not limited to a personal computer, smartphone, tablet, e-book reader, and the like and combinations thereof. Generally, the user will scan or otherwise enter the unique identifier into an application of the device that allows the device to access an account hosted by the management module 24 and thereby view, query, enter, and/or change information stored in the user account of the user and associated with the toy 10.

The system for promoting travel education 10 includes a management module 24 configured to manage an account associated with the toy 10 and thereby interact with the toy 10 and promote travel education. The management module is configured to manage a user account associated with the toy 10 and to receive and/or store location information and/or other information in regards to the toy 10 through the unique identifier. The management module 24 is configured to store, provide and enforce a set of rules on the user account based on the particular geographic location of the toy 10 associated with the user account. The management module 24 is may include a game is configured to provide a game experience related to the toy. The management module 24 may track an inventory of virtual items, achievements, unlocks, and/or other characteristics of the user account associated with the toy and may enforce rules that may be based on, triggered by, and/or otherwise associated with details of such an inventory. Some awards/characteristics may be exclusive, such as but not limited to being the first toy to visit a particular location. Such may influence/change/modify/adjust how system rules are applied to characteristics of the toy, such as but not limited to an item that "permits breathing underwater" removing a restriction on a toy that would restrict a toy from participating in an "underwater" event wherein the toy cannot "breathe" underwater otherwise.

The system for promoting travel education 15 includes a third party collaboration module 22 in communication with the management module 24 and configured to provide third party interactivity and collaboration to a user account. The third party collaboration module 22 is configured to host events and/or to provide a product offer to a user of the user account management module associated with the toy 10. The third party collaboration module 22 is configured to provide event setup and management capabilities to a user of the user account management module associated with the toy 10. The third party collaboration is configured to provide products (real and/or virtual) available for purchase to a user of the user account management module associated with the toy 10.

The system for promoting travel education 15 includes a user collaboration module 20 in communication with the management module 24 and is configured to provide user interactive and collaboration capabilities between a plurality of users of the user account management module, each having separate user accounts associated therewith. The user collaboration module 20 is configured to provide user created event setup and management capabilities to a user of the user account management module associated with the toy 10. The user collaboration module 20 is configured to provide social media interactivity and access to a user of the user account management module associated with the toy 10. Such may include but is not limited to online messaging, gifts, transactions, group formation/management, event hosting, event management, and the like and combinations thereof.

Figure 4:
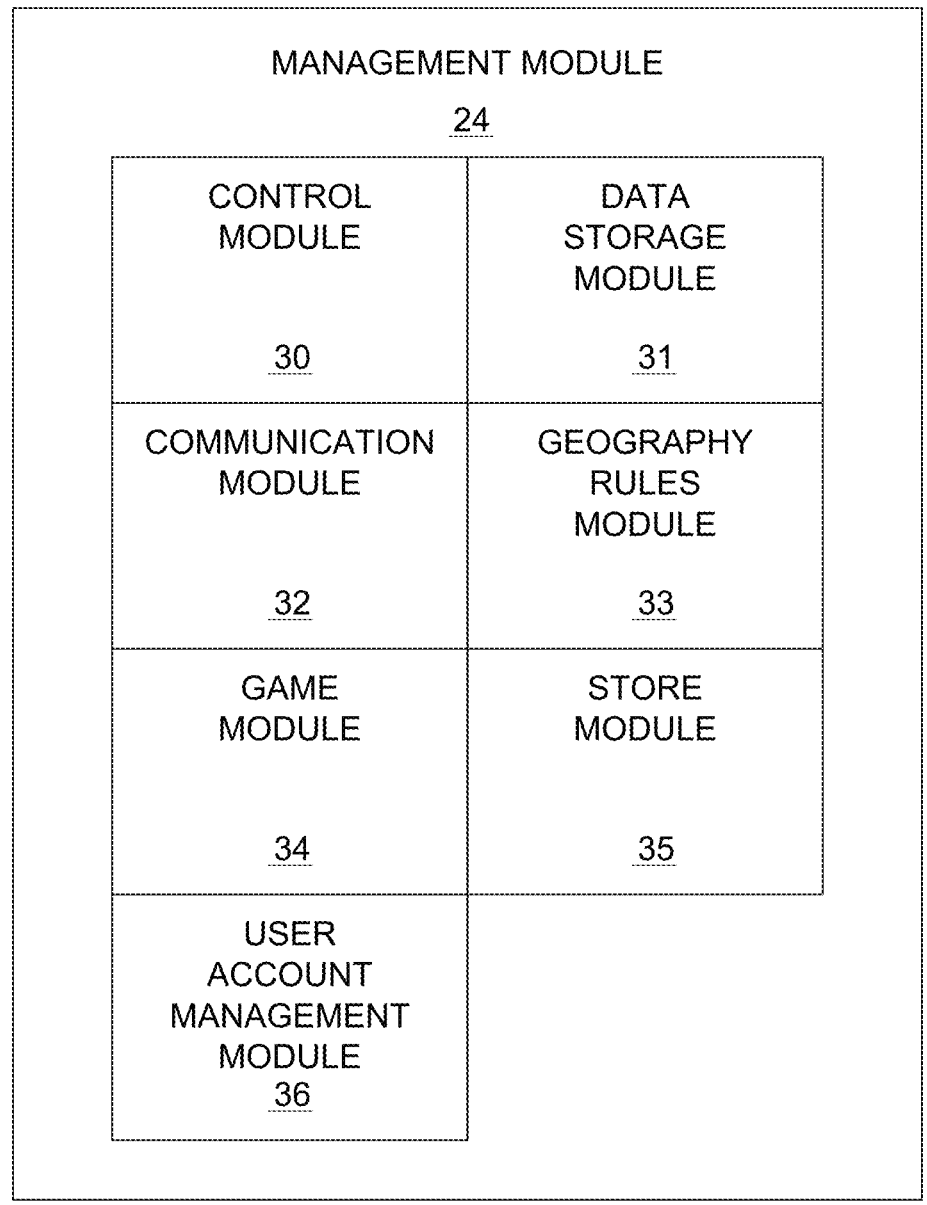
FIG. 4 is a module diagram of a management module of a system for promoting travel education, according to one embodiment of the invention.

FIG. 4 is a module diagram of a management module of a system for promoting travel education, according to one embodiment of the invention. There is shown a management module 24 including a control module 30, a data storage module 31, a communication module 32, a geography rules module 33, a game module 34, a store module 35, and a user account management module 36. The illustrated modules are in communication with each other and/or with other modules described herein to the degree appropriate to perform their respective functions. In general, a management module manages the system and facilitates the operation and/or communication of the other modules described herein. The management module may act as a hub and/or may give permissions to the other modules described herein and/or may enforce system rules over one or more of the other modules described herein.

The illustrated management module 24 is configured to interact with a toy and thereby promote travel education therethrough. The management module is configured to manage a user account associated with the toy. The management module is configured to receive location information in regards to the toy through a unique identifier disposed on the toy. The management module 24 is configured to store, provide and enforce a set of rules on a user account based on a particular geographic location of the toy associated with the user account. The management module 24 is configured to provide a game experience related to the toy. Non-limiting examples of a management module may be an account management module as described in U.S. Patent Publication No.: 2003/0014509; or a management module as described in U.S. Pat. No. 8,265,650, which are incorporated for their supporting teachings herein.

The illustrated management module includes a control module configured to provide operational instructions and commands to the modules and components of the management module. The control module is in communication with the modules and components of the management module (and/or other modules described herein) and is configured to provide managerial instructions and commands thereto. The source of such instructions/commands may be from one or more other modules described herein and/or through interactions between one or more other modules described herein. The control module is configured to set parameters and settings for each module and component of the management module. Non-limiting examples of a control module may be a control module described in U.S. Pat. No. 5,430,836, issued to Wolf et al.; or a control module described in U.S. Pat. No. 6,243,635, issued to Swan et al. which are incorporated for their supporting teachings herein. A control module may include but is not limited to a processor, a state machine, a script, a decision tree, and the like.

The illustrated management module includes a communication module, such as a network card, system bus, or wireless communication module, and is configured to communicate with a computerized network. The communication module is configured to provide communication capabilities, such as wireless communication, to the modules and components of the management module and the components and other modules described herein. The communication module may be configured to provide communication between a wireless device, such as a mobile phone, and a computerized network and/or to facilitate communication between a mobile device and other modules described herein. The communication module may have a component thereof that is resident on a user's mobile device. Non-limiting examples of a wireless communication module may be but not limited to: a communication module described in U.S. Pat. No. 5,307,463, issued to Hyatt et al.; or a communication module described in U.S. Pat. No. 6,133,886, issued to Fariello et al., which are incorporated for their supported herein.

The illustrated management module includes a data storage module in communication with the modules and components of the management module. The data storage module is configured to collect and store data for each of the modules of the management module. The data storage module is in communication with the various modules and components of the system for promoting travel education and is configured to store data transferred there through. The data storage module is configured to store data transferred through each of the modules of the management module, thereby updating the system and the management module with up to date data and real time user data. The data storage module is configured to securely store user data along with data transferred through the management module. Data storage modules may be databases and/or data files and the memory storage device may be, but is not limited to, hard drives, flash memory, optical discs, RAM, ROM, and/or tapes. A non-limiting example of a data base is Filemaker Pro 11, manufactured by Filemaker Inc., 5261 Patrick Henry Dr., Santa Clara, Calif., 95054. Non-limiting examples of a data storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The illustrated management module includes a geography rules module is in communication with the module and components of the management module. The geography rules module is configured to set and enforce a set of geography rules or parameters for a particular geographical association for use with a toy. The toy includes a particular geographical association configured to associate the toy with a particular geographical location. The geography rules module is configured to store, provide and enforce a set of rules on a user account based on a particular geographic location of the toy associated with the user account. In general, there may be an overarching set of rules that apply to all toys of a system and then there may be sets of characteristics that toys have that interact with the rules. Accessories and/or achievements may modify characteristics of the toys and/or may alter the rules themselves as applied to the toy(s) and/or alter how the rules come into effect. As a non-limiting example of similar rules and toy/object interaction, the card game sold under the brand Magic the Gathering of Wizards of the Coast of Seattle Wash. includes cards (toys) with an overarching ruleset wherein the cards themselves may modify the rules and/or how those rules are applied to themselves and/or other cards. The rules found at http://media.wizards.com/images/magic/tcg/resources/rules/MagicCompRules_20130201.txt as of 2 May 2013 are incorporated by reference herein for their supporting teachings. Non-limiting examples of a rules enforcing module may be a system as described in U.S. Pat. No. 8,254,257; or a management system as described in U.S. Patent Publication No.: 2012/0240172, which are incorporated for their supporting teachings herein. The following table is an example of a table of geography rules that may be stored and/or enforced against. Accessories and/or achievements may grant characteristics to a toy (permanently or temporarily):

| Toy characteristics | Rule modification |
| --- | --- |
| Water breathing | Can survive extended periods in an underwater environment |
| Air breathing | Can survive extended periods in an air environment |

| Toy characteristics | Rule modification |
| --- | --- |
| Wet | Requires regular access to a wet environment to survive |
| High altitude | Does not suffer action limitations in high altitude environments |
| Direction Sense | Is not subject to "getting lost" events |
| Sense of Smell | Is able to detect objects with the "has smell" characteristic even if they have the "undetectable:sight" characeristic |
| Flight | Is able to access sub-locations having the "innacessible:height" characteristic |

As a non-limiting example, a toy starfish may have the Water Breathing and Wet characteristics on purchase. The user may take a first trip with the toy starfish to a location with a Dry characteristic and record the journey with the system. The system may automatically generate a story associated with that journey and the story may include hardships suffered by the toy during the journey because of the lack of water. The user may then play games and/or otherwise earn points with the system and then spend them on virtual objects to help the toy starfish better survive the Dry environment, such as but not limited to a Wetness Gel that, as a single use, grants a location the Wet characteristic for the duration of a journey and a Nose Mask that grants the toy the Sense of Smell characteristic while "worn." The user then takes a second trip to the same location and records the journey with the system, indicating that the Nose Mask was worn and that the Wetness Gel was used. The system then automatically generates a story associated with the second trip and appends it to the ongoing story. The user may be given more options, rewards, experiences and the story may reflect these and/or may reflect a different experience for the toy starfish because of the impact the accessories have on the overarching rules and how they are enforced by the system.

The illustrated management module includes a game module in communication with the modules and components of the management module. The game module is configured to provide a game experience related to a toy and/or to travel of a toy of the system for promoting travel education. The game module may be configured to receive location information in regards to the toy through a unique identifier disposed on the toy. Non-limiting examples of a game module may be a system as described in U.S. Patent Publication No.: 2007/0129123; or a system as described in U.S. Pat. No. 8,317,606, which are incorporated for their supporting teachings herein. The game module may provide adventures, quests, skill games, educational games, quizzes, chance games, and the like to users of the system and such games may be provided between journeys of the toy and/or may be associated with the automatically generated ongoing story of the toy, such as but not limited to providing a "choose-your-own-adventure" style game that is influenced by the geography rules module and/or a role-playing game (text-based and/or graphical; first-person and/or third-person perspectives; etc.). The playing of the game may influence the content of the automatically generated storyline for the toy. There may be competitive/cooperative multiplayer games between users of various toys.

The illustrated management module includes a store module in communication with the modules and components of the management module. The store module is configured to enable a user of the toy to purchase accessories, add-ons, expansion packs, etc. to the toy to enhance the interactability of the toy during travel. Non-limiting examples of a store module may be a system as described in U.S. Patent Publication No.: 2013/0095910; or an online store as described in U.S. Patent Publication No.: 2013/0054330, which are incorporated for their supporting teachings herein. Purchases may be made using real and/or virtual currencies. Purchases may be made through the store module by third-parties (merchants, event promoters, parents, etc.) for the benefit of a particular toy, toy category, user, user group, and/or etc.

The illustrated management module includes a user account management module, wherein each toy is associated with a user account. Each user account is in communication with the user account management module of the management module over a computerized network. The user account management module is configured to provide user account management capabilities. The management module is configured to store and update user account data such as, but not limited to: characteristics, preferences, profiles, ratings, credentials, certifications, etc. associated with the user account. The management module is configured to store and reference data associated with a specific toy associated with the user. Non-limiting examples of a management module may be an account creation module as described in U.S. Patent Publication No.: 2008/0281617, by Conrad et al.; or an account management system as described in U.S. Patent Publication No.: 2003/0028790, by Bleumer et al. which are incorporated by reference for their supporting teachings herein.

Figure 5:
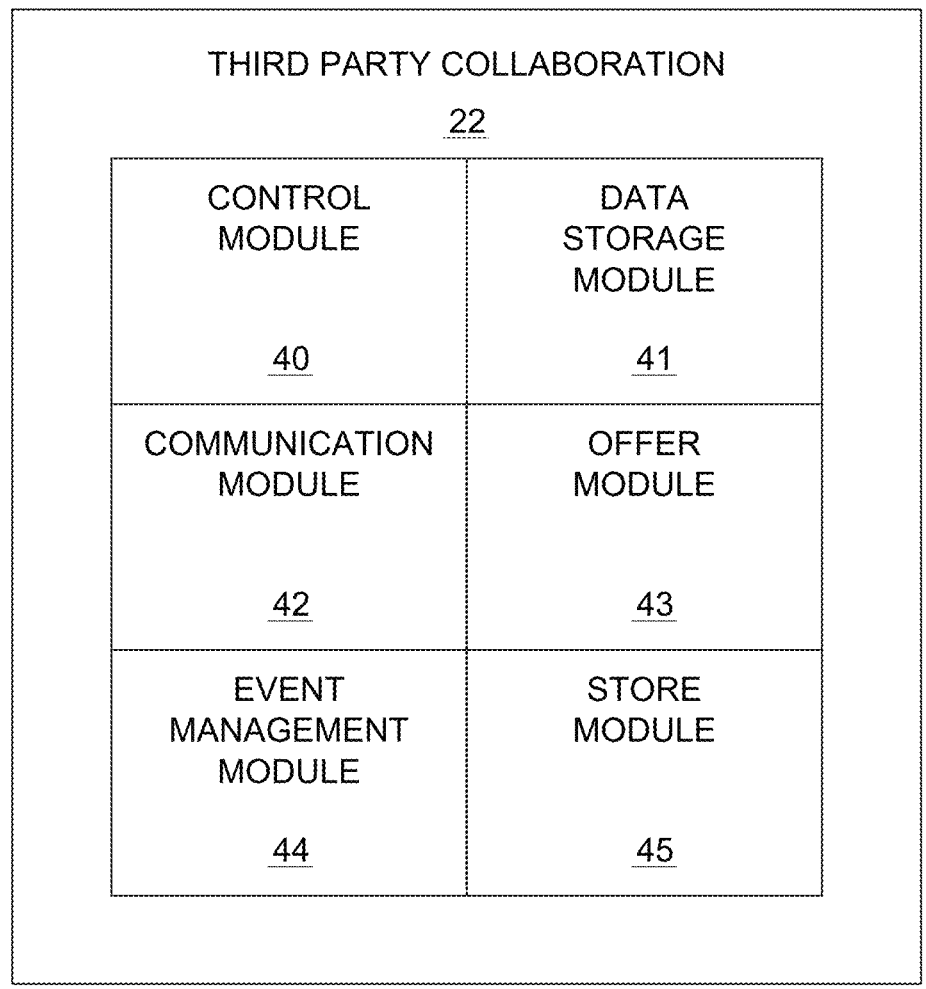
FIG. 5 is a module diagram of a third party collaboration module of a system for promoting travel education, according to one embodiment of the invention.

FIG. 5 is a module diagram of a third party collaboration module of a system for promoting travel education, according to one embodiment of the invention. There is shown a third party collaboration module 22 including a control module 40, a data storage module 41, a communication module 42, an offer module 43, an event management module 44, and a store module 45. The illustrated modules are in communication with each other and/or with other modules described herein to the degree appropriate to perform their respective functions.

The illustrated third party collaboration module 22 is in communication with the management module 24 of a system for promoting travel education over a computerized network. The third party collaboration module 22 is configured to provide third party interactivity and collaboration to a user account. Third-parties may include merchants, vendors, parents, guardians, club managers, and the like. The third party collaboration module 22 is configured to provide a product offer to a user of the user account management module associated with the toy. The third party collaboration module 22 is configured to provide event setup and management capabilities to a user of the user account management module associated with the toy. The third party collaboration module 22 is configured to provide products available for purchase to a user of the user account management module associated with the toy. Non-limiting examples of a third party collaboration module may be a system as described in U.S. Pat. No. 8,374,944; or a system as described in U.S. Patent Publication No.: 2012/0231441, which are incorporated for their supporting teachings herein.

The illustrated third party collaboration module includes a control module configured to provide operational instructions and commands to the modules and components of the third party collaboration module. The control module is in communication with the modules and components of the third party collaboration module and is configured to provide managerial instructions and commands thereto. The control module is configured to set parameters and settings for each module and component of the third party collaboration module.

The illustrated third party collaboration module includes a communication module, such as a wireless communication module, and is configured to communicate with a computerized network. The communication module is configured to provide communication capabilities, such as wireless communication, to the modules and components of the third party collaboration module and the components and modules disposed therein. The wireless communication module may be configured to provide communication between a wireless device, such as a mobile phone, and a computerized network.

The illustrated third party collaboration module includes a data storage module in communication with the modules and components of the third party collaboration module. The data storage module is configured to collect and store data for each of the modules of the third party collaboration module. The data storage module is in communication with the various modules and components of the system for promoting travel education and is configured to store data transferred there through. The data storage module is configured to store data transferred through each of the modules of the third party collaboration module, thereby updating the system and the third party collaboration module with up to date data and real time third party data and user data. The data storage module is configured to securely store user data along with data transferred through the third party collaboration module.

The illustrated third party collaboration module includes an offer module in communication with the modules and components of the third party collaboration module. The offer module is configured to provide a product offer to a user of the user account management module associated with the toy. The offer module is configured to provide products from third party vendors or service providers related to the system for promoting travel education. Non-limiting examples of an offer module may be a system as described in U.S. Patent Publication No.: 2013/0054364; or a system as described in U.S. Pat. No. 8,209,220, which are incorporated for their supporting teachings herein. Through the offer module, merchants may promote their brand and/or goods/services and may configure and/or publish such promotions to the system and its users. The offer module may include an account management module for managing a merchant account and such may include data storage and/or media and/or object management/creation capabilities, such as but not limited to permitting merchants to create accessories within the system that they may then award to users who bring their toys into their establishment and record the journey. There may be rules within the system that govern, limit, control, restrict, or otherwise influence what the third-party can create and/or publish to users of the system and to which users the creations can be distributed to.

The illustrated third party collaboration module may includes an event management module in communication with the modules and components of the third party collaboration module. The event management module is configured to provide event setup and management capabilities to a user of the user account management module associated with the toy. The event may integrate with one or more modules described herein to give the event one or more characteristics that interact with the rules and/or the toys and/or may interact to provide enhanced opportunities for user collaboration and/or games to be played at the event. The event may be scripted and/or may contribute to the ongoing storyline for one or more toys present at the event. Events may include but are not limited to birthday parties, store openings, product launches, themed parties, portions of ongoing games/quests, and the like and combinations thereof. Non-limiting examples of an event management module may be an event management system as described in U.S. Patent Publication No.: 2002/0103803; or a system for event management as described in U.S. Patent Publication No.: 2012/0322411; or a system as described in U.S. Patent Publication No.: 2002/0156787, which are incorporated for their supporting teachings herein.

The illustrated third party collaboration module includes a store module in communication with the modules and components of the third party collaboration module. The store module is configured to provide products available for purchase to a user of the user account management module associated with the toy. The store module is configured to enable a user of the toy to purchase accessories, add-ons, expansion packs, etc. to the toy to enhance the interactability of the toy during travel. Non-limiting examples of a store module may be a system as described in U.S. Patent Publication No.: 2013/0095910; or an online store as described in U.S. Patent Publication No.: 2013/0054330, which are incorporated for their supporting teachings herein.

Figure 6:
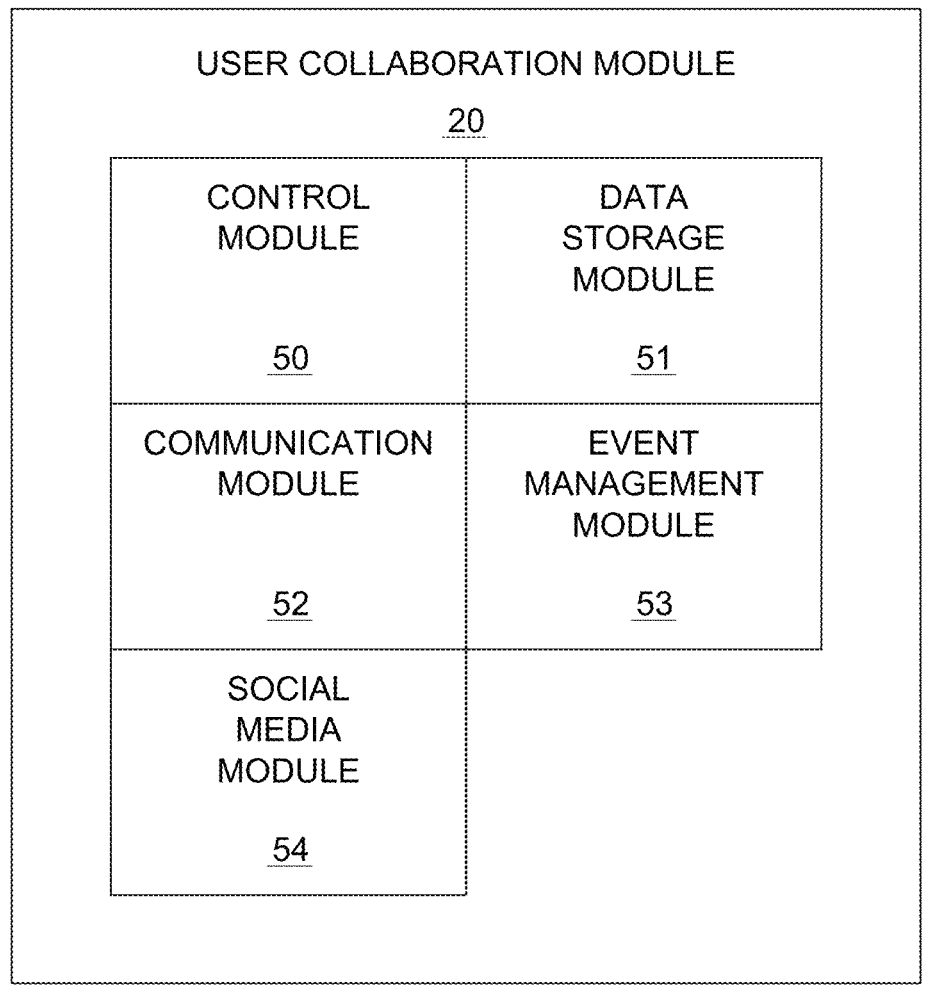
FIG. 6 is a module of a user collaboration module of a system for promoting travel education, according to one embodiment of the invention.

FIG. 6 is a module of a user collaboration module of a system for promoting travel education, according to one embodiment of the invention. There is shown a user collaboration module 20 including a control module 50, a data storage module 51, a communication module 52, an event management module 53, and a social media module 54. The illustrated modules are in communication with each other and/or with other modules described herein to the degree appropriate to perform their respective functions.

The illustrated user collaboration module 20 is in communication with the management module and is configured to provide user interactive and collaboration capabilities to a plurality of users of the user account management module, each having separate user accounts associated therewith. The user collaboration module 20 is configured to provide user created event and/or group setup and management capabilities to a user of the user account management module associated with the toy. The user collaboration module 20 is configured to provide social media interactivity and access to a user of the user account management module associated with the toy.

The illustrated user collaboration module includes a control module configured to provide operational instructions and commands to the modules and components of the user collaboration module. The control module is in communication with the modules and components of the user collaboration module and is configured to provide managerial instructions and commands thereto. The control module is configured to set parameters and settings for each module and component of the user collaboration module.

The illustrated user collaboration module includes a communication module, such as a wireless communication module, and is configured to communicate with a computerized network. The communication module is configured to provide communication capabilities, such as wireless communication, to the modules and components of the user collaboration module and the components and modules disposed therein. The wireless communication module may be configured to provide communication between a wireless device, such as a mobile phone, and a computerized network.

The illustrated user collaboration module includes a data storage module in communication with the modules and components of the user collaboration module. The data storage module is configured to collect and store data for each of the modules of the user collaboration module. The data storage module is in communication with the various modules and components of the system for promoting travel education and is configured to store data transferred there through. The data storage module is configured to store data transferred through each of the modules of the user collaboration module, thereby updating the system and the user collaboration module with up to date data and real time user collaboration data. The data storage module is configured to securely store user data along with data transferred through the user collaboration module.

The illustrated user collaboration module includes a event management module in communication with the modules and components of the user collaboration module. The event management module is configured to provide event setup and management capabilities to a user of the user account management module associated with the toy. Non-limiting examples of a event management module may be a event management system as described in U.S. Patent Publication No.: 2002/0103803; or a system for event management as described in U.S. Patent Publication No.: 2012/0322411; or a system as described in U.S. Patent Publication No.: 2002/0156787, which are incorporated for their supporting teachings herein.

The illustrated user collaboration module includes a social media module in communication with the modules and components of the user collaboration module. The social media module is configured to link a user to a social media site. The social media module is configured to provide access to a social media site; wherein the user may post or link data regarding the use of the system for promoting travel education or related to the toy. The social media module is configured to enable a user to promote a product or service related to the system for promoting travel education through a social media site over a computerized network. Non-limiting examples of a social media module may be Facebook, Twitter, Instagram, LinkedIn, YouTube, and etc. and/or applications thereof. Such may be integrated with a social network system and may provide announcements, feedback, and/or collaborative usage through a network.

Figure 7:
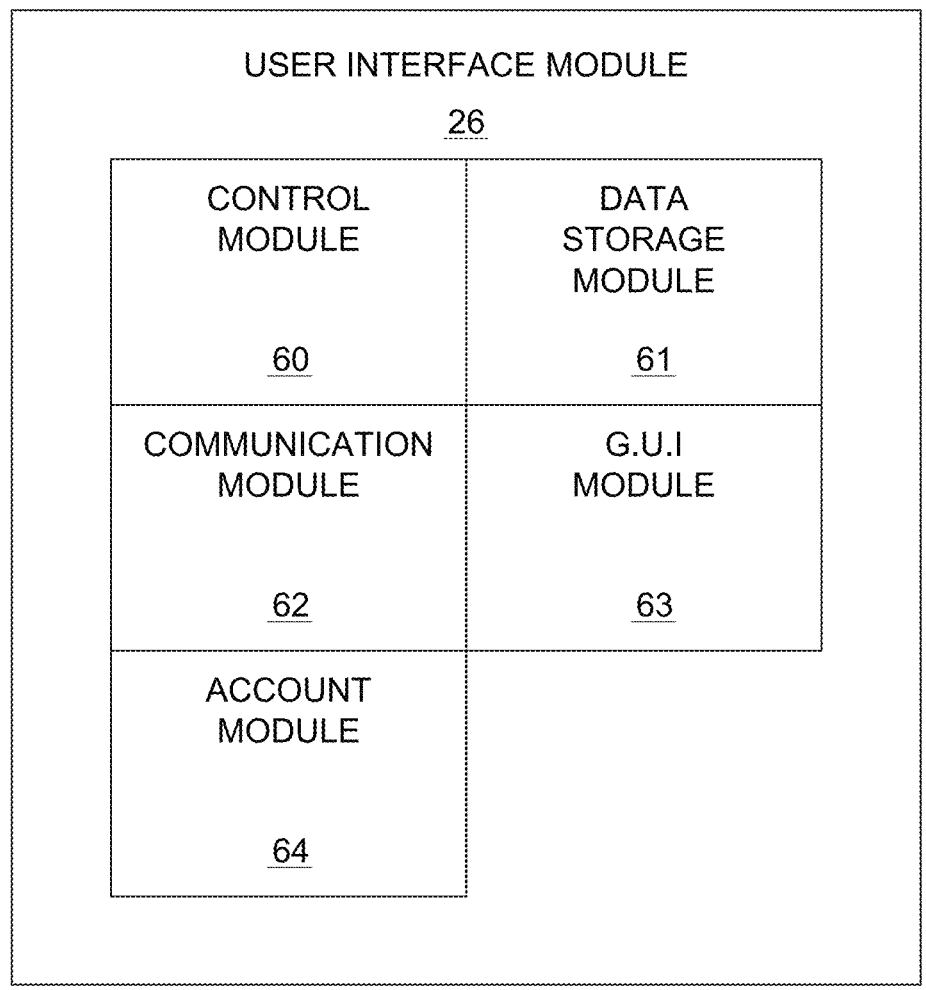
FIG. 7 is a module diagram of a user interface module of a system for promoting travel education, according to one embodiment of the invention.

FIG. 7 is a module diagram of a user interface module of a system for promoting travel education, according to one embodiment of the invention. There is shown a user interface module 26 including a control module 60, a data storage module 61, a communication module 62, a graphical user interface module 63, and an account module 64. The illustrated modules are in communication with each other and/or with other modules described herein to the degree appropriate to perform their respective functions.

The illustrated a user interface module 26 is in communication with the management module 24 and a toy 10 of a system for promoting travel education. The user interface module 26 is configured to provide user interface capabilities to a user of the user account management module associated with the toy.

The illustrated user interface module includes a control module configured to provide operational instructions and commands to the modules and components of the user interface module. The control module is in communication with the modules and components of the user interface module and is configured to provide managerial instructions and commands thereto. The control module is configured to set parameters and settings for each module and component of the user interface module.

The illustrated user interface module includes a communication module, such as a wireless communication module, and is configured to communicate with a computerized network. The communication module is configured to provide communication capabilities, such as wireless communication, to the modules and components of the user interface module and the components and modules disposed therein. The wireless communication module may be configured to provide communication between a wireless device, such as a mobile phone, and a computerized network.

The illustrated user interface module includes a data storage module in communication with the modules and components of the user interface module. The data storage module is configured to collect and store data for each of the modules of the user interface module. The data storage module is in communication with the various modules and components of the system for promoting travel education and is configured to store data transferred there through. The data storage module is configured to store data transferred through each of the modules of the user interface module, thereby updating the system and the user interface module with up to date data and real time user interface data. The data storage module is configured to securely store user data along with data transferred through the user interface module.

The illustrated user interface module includes a graphical user interface module, G.U.I. module in communication with the modules and components of the user interface module. The user interface module is configured to provide individual user interface capabilities with the system for promoting travel education system over a computerized network. The user interface module is configured to provide one or more interfaces for accessing the system and the modules and components thereof. The user interface module is configured to provide access to the toy's virtual account/ presence and the user account associated therewith. Such may include one or more graphical user interfaces that may be embodied in software instructions for controlling display on a display (such as but not limited to a TV, monitor, cell phone/tablet screen, etc.) and/or for routing signals from an input device (such as but not limited to a keyboard, touch-screen, mouse, etc.) such that a user may perform data entries or queries in the system, issue suggestions or recommendations, and receive data information therefrom. Such may be embodied in one or more user interfaces that permit browsing of the system. Such may be embodied in one or more user interfaces that permit service personnel to make adjustments, changes, and otherwise provide personal profile updates to the system. Such may be embodied in one or more user interfaces that permit review of data from the system, such as but not limited to travel data, vacation data, profile data, other user profile data. Non-limiting examples of interface modules may be a HTML player, client server application, Java script application. A non-limiting example of an interface module is FlowPlayer 3.1, manufactured by FlowPlayer LTD, Hannuntie 8 D, ESPOO 02360, Helsinki, Finland. Non-limiting examples of a display/interface module may be a display/interface module as described in U.S. Pat. No. 6,272,562, issued to Scott et al.; a touch screen interface module as described in U.S. Pat. No. 5,884,202 and U.S. Pat. No. 6,094,609, issued to Arjomand, which are incorporated for their supporting teachings herein.

The illustrated user interface module includes an account module in communication with the modules and components of the user interface module. The account module is configured to manage and store personal user account settings, preferences, and parameters, personal data, financial data, business data, etc. for use with the toy and the system for promoting travel education. The account module is configured to store user and toy data along with previous transaction data with any third parties or other users of the system. Non-limiting examples of an account module may be a system as described in U.S. Patent Publication No.: 2012/0310701; or a user account module as described in U.S. Patent Publication No.: 2012/0330785, which are incorporated for their supporting teachings herein.

Figure 8:
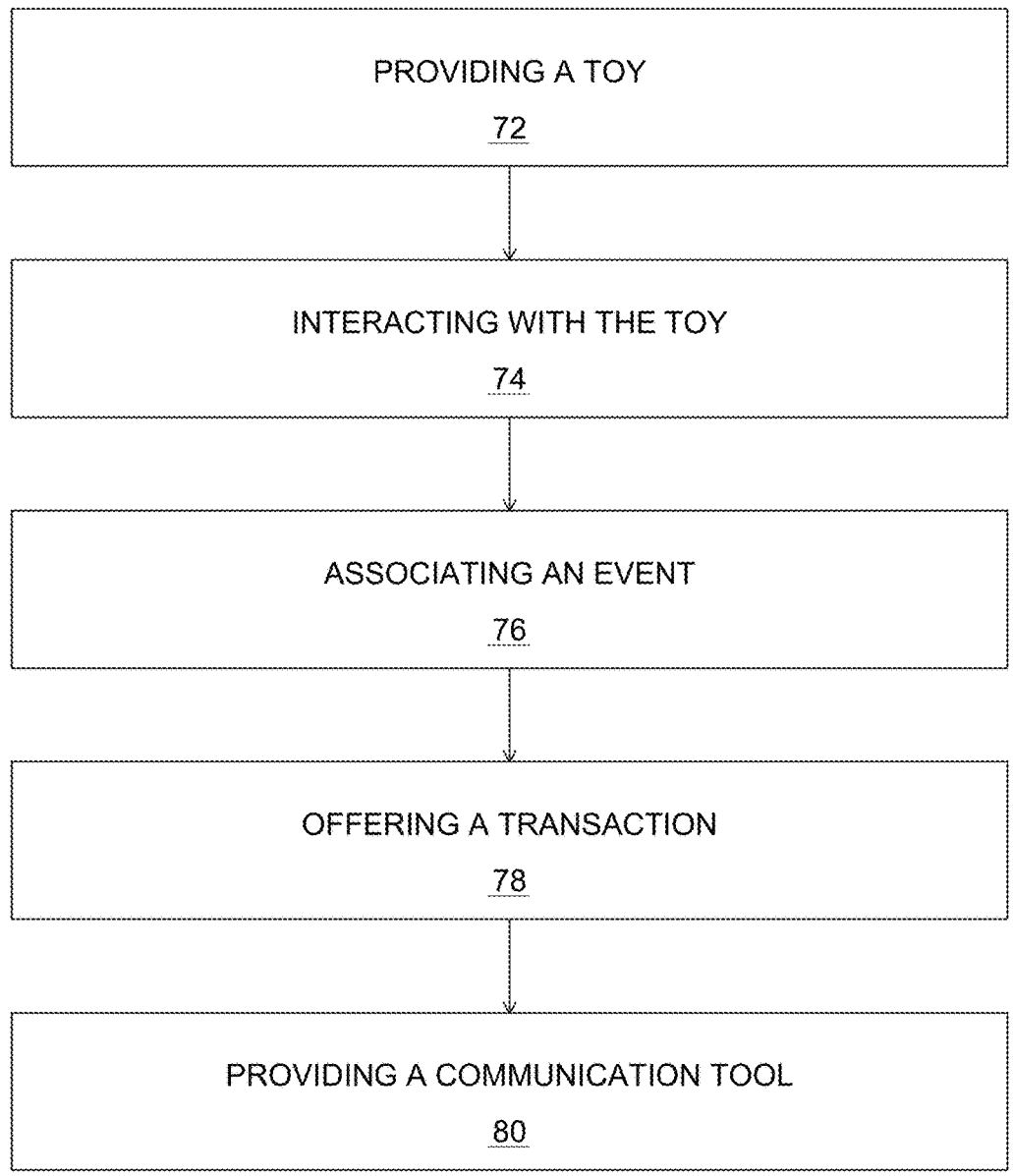
FIG. 8 is a flowchart of a method of promoting travel education, according to one embodiment of the invention.

FIG. 8 is a flowchart of a method of promoting travel education, according to one embodiment of the invention. There is shown a method of promoting travel education including the steps of providing a toy, interacting with the toy, associating an event with the toy, offering a transaction, and providing a communication tool.

According to one embodiment of the invention, there is a method of promoting travel education. The method includes the step of providing a toy having a particular geographic association represented visually on the toy 72. The toy includes a unique identifier observable on the toy and associated with the particular geographic association. The toy includes a coupling device configured to couple a body of the toy to an exterior of a vehicle.

The method of promoting travel education includes the step of interacting with the toy and thereby promoting travel education 74. The step of interacting with the toy includes the step of associating a user account with the unique identifier of the toy, managing a user account associated therewith, receiving location information in regards to the toy, and enforcing a set of rules on the user account based on the particular geographic location of the toy associated with the user account and the received location information. The set of rules includes requiring a user to perform an action before transporting the toy to a particular location. The geographic association is associated with a climate.

The method of promoting travel education includes the step of associating an event with the user account 76. The method includes the step of offering a transaction in association with the user account 78. The method includes the step of providing a communication tool to a plurality of users, thereby permitting the same to communicate with each other 80.

Figure 9:
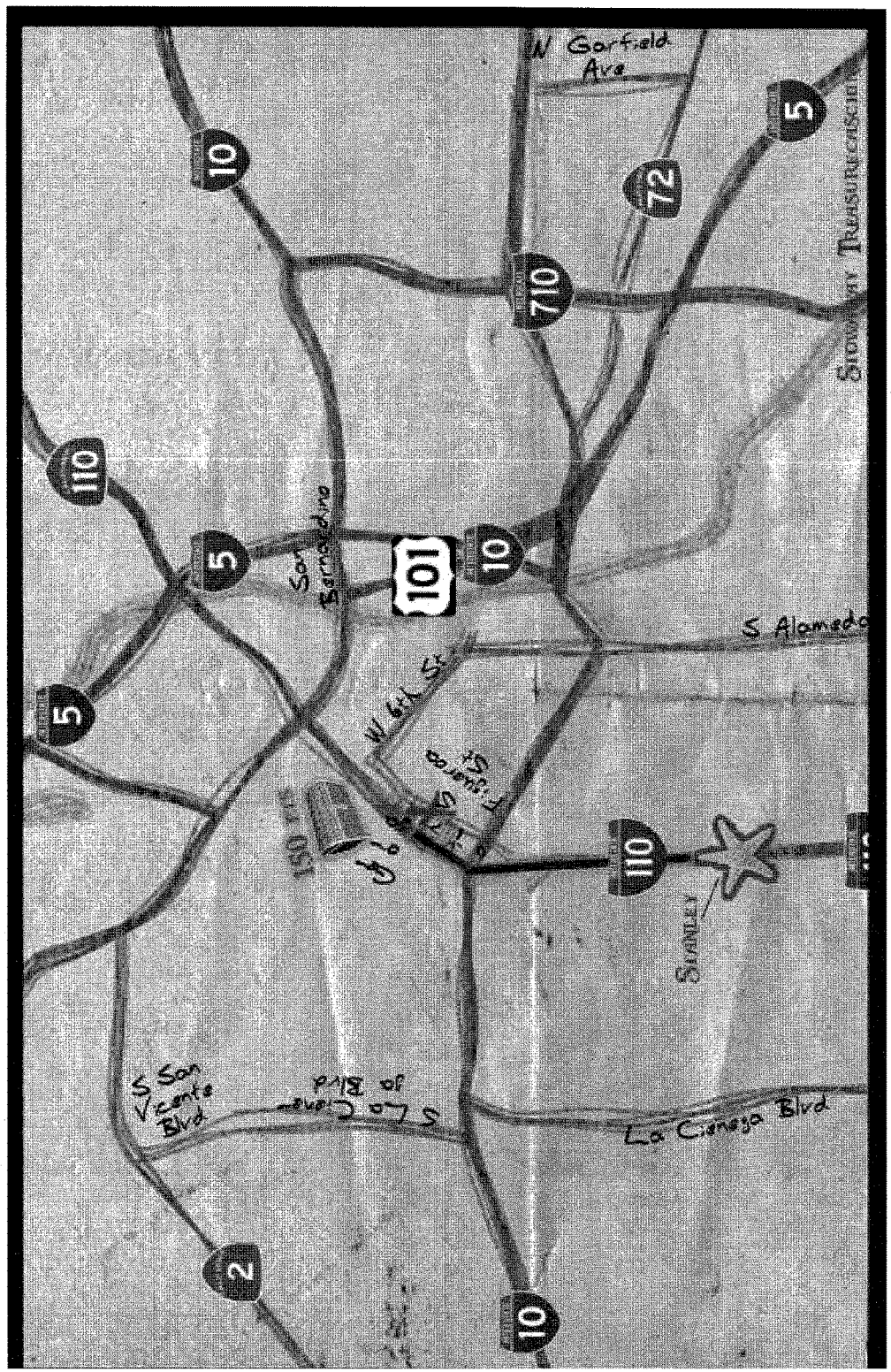
Figure 10:
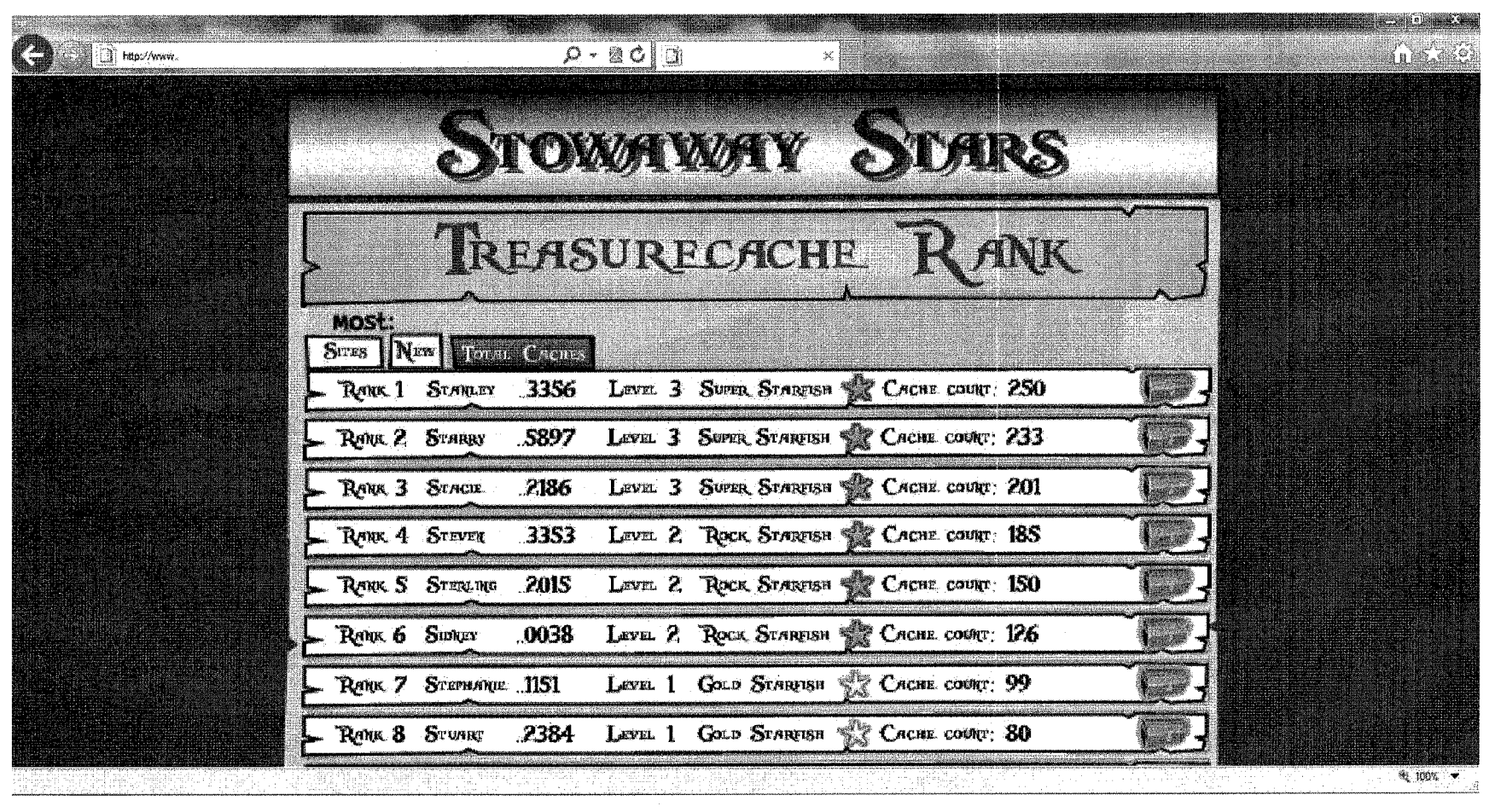

FIGS. 9-10 are prophetic exemplary screenshots of a graphical user interface module of a system for promoting travel education, according to one embodiment of the invention.

FIG. 9 illustrates a conceptual view of a graphical user interface module including global positioning capabilities to a treasure caches, according to one embodiment of the invention.

FIG. 10 illustrates a conceptual view of a graphical user interface including point calculation for ranking users of the system, according to one embodiment of the invention.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a particular method, it is understood that the methods of educating and/or entertaining users of the system described herein are plethoric.

Additionally, although the figures illustrate a starfish toy, it is understood that the toy may take a near infinite variety of aesthetic forms, including but not limited to animals, plants, fantastic creatures, people, science fiction themed objects/creatures, simulacra, models of objects, and the like and combinations thereof.

It is also envisioned that the system may include a layer of fictionalization in regards to places travelled, such as but not limited to recording travel throughout Europe as if the travel had occurred in a previous time, such as but not limited to the Renaissance, wherein place names and possible encounters are fictionalized to match up with historical and/or fantastical settings.

Finally, it is envisioned that the components of the toy and/or physical accessories may be constructed of a variety of materials, including but not limited to rubber, plastics, ceramics, metals, fibers, composites and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A system for promoting travel education, comprising:
   a) a toy, having:
      a1) a particular geographic association represented visually on the toy;
      a2) a unique identifier observable on the toy and associated with the particular geographic association; and
      a3) a coupling device configured to couple a body of the toy to an exterior of a vehicle; and
   b) a management module configured to interact with the toy and thereby promote travel education, including:
      b1) a user account management module associated with the unique identifier of the toy and configured to manage a user account associated with the toy and to receive location information of the toy; and
      b2) a geographic rules module in communication with the user account management module and configured to store, provide and enforce a set of rules on the user account based on the particular geographic association of the toy associated with the user account as compared to location information of the toy.

2. The system of claim 1, wherein the management module further includes a game module in communication with the user account management module and the geographic rules module, and configured to provide a game experience related to the toy, and wherein the management module permits users to trade accessories between user accounts.

3. The system of claim 1, further comprising a third party collaboration module in communication with the management module and configured to provide third party interactivity and collaboration to the user account.

4. The system of claim 3, wherein the third party collaboration module includes:
   a) an offer module configured to provide a product offer to a first user of the user account management module associated with the toy;
   b) an event management module configured to provide event setup and management capabilities to a second user of the user account management module associated with the toy; and
   c) a store module configured to provide products available for purchase to a third user of the user account management module associated with the toy, wherein the first user, the second user, and the third user may be, but are not necessarily, the same user.

5. The system of claim 1, further comprising a user collaboration module in communication with the management module and configured to provide user interactive and collaboration capabilities to a plurality of users of the user account management module, each user of the plurality of users having a separate user account.

6. The system of claim 5, wherein the user collaboration module includes:
   a) an event management module configured to provide user created event setup and management capabilities to a user of the user account management module associated with the toy; and
   b) a social media module configured to provide social media interactivity and access to a user of the user account management module associated with the toy.

7. The system of claim 1, further comprising a user interface module in communication with the management module and configured to provide user interface capabilities to a user of the user account management module associated with the toy.

8. A system for promoting travel education, comprising:
   a) a toy, having:
   a1) a particular geographic association represented visually on the toy, wherein the geographic association represents a geographic region of the toy and the toy represents a living creature that is found in that home region; and
   a2) a unique identifier observable on the toy and associated with the particular geographic association; and
   a3) a coupling device configured to couple a body of the toy to an exterior of a vehicle; and
   b) a management module configured to interact with the toy and thereby promote travel education, including:
   b1) a user account management module associated with the unique identifier of the toy and configured to manage a user account associated with the toy and to receive location information of the toy; and
   b2) a geographic rules module in communication with the user account management module and configured to store, provide and enforce a set of rules on the user account based on the particular geographic association of the toy associated with the user account in combination with location information of the toy, wherein the set of rules includes rules associated with climate characteristic differences in between the geographic association and the location information.

9. The system of claim 8, wherein the management module further includes a game module in communication with the user account management module and the geographic rules module, and configured to provide a game experience related to the toy.

10. The system of claim 9, further comprising a third party collaboration module in communication with the management module and configured to provide third party interactivity and collaboration to the user account.

11. The system of claim 10, wherein the third party collaboration module includes:
   a) an offer module configured to provide a product offer to a user of the user account management module associated with the toy;
   b) an event management module configured to provide event setup and management capabilities to a user of the user account management module associated with the toy; and
   c) a store module configured to provide products available for purchase to a user of the user account management module associated with the toy.

12. The system of claim 11, further comprising a user collaboration module in communication with the management module and configured to provide user interactive and collaboration capabilities to a plurality of users of the user account management module, each user of the plurality of users having a separate user account.

13. The system of claim 12, wherein the user collaboration module includes:
   a) an event management module configured to provide user created event setup and management capabilities to a user of the user account management module associated with the toy; and
   b) a social media module configured to provide social media interactivity and access to a user of the user account management module associated with the toy.

14. The system of claim 13, further comprising a user interface module in communication with the management module and configured to provide user interface capabilities to a user of the user account management module associated with the toy.

15. A method of promoting travel education, comprising the step of:
   a) providing a toy, having:
   a1) a particular geographic association represented visually on the toy;
   a2) a unique identifier observable on the toy and associated with the particular geographic association; and
   a3) a coupling device configured to couple a body of the toy to an exterior of a vehicle;
   wherein the step of proving the toy further comprises coupling the body of the toy to the exterior of the vehicle; and
   b) interacting with the toy and thereby promote travel education, including the steps of:
   b1) associating a user account with the unique identifier of the toy, thereby associating the user account with the toy;
   b2) managing the user account associated with the toy;
   b3) receiving location information of in regards to the toy; and
   b4) enforcing a set of rules on the user account based on the particular geographic association of the toy associated with the user account and the received location information.

16. The method of claim 15, further comprising associating an event with the user account.

17. The method of claim 16, wherein the user is a first user and further comprising receiving location information of the toy of the first user over a network from a second user and providing an option to the user account of the first user based on receiving the location information of the toy of the first user from the account of the second user.

18. The method of claim 17, further comprising providing a communication tool to a plurality of users, thereby permitting the plurality of users to communicate with each other.

19. The method of claim 18, wherein the set of rules includes requiring a user to perform an action before transporting the toy to a particular location.

20. The method of claim 19, wherein the geographic association is an association with a climate.

* * * * *